United States Patent
Shachi et al.

(12)

(10) Patent No.: US 6,410,109 B1
(45) Date of Patent: *Jun. 25, 2002

(54) RESIN COMPOSITION AND USAGE THEREOF

(75) Inventors: Kenji Shachi; Kazushige Ishiura, both of Tsukuba (JP)

(73) Assignee: Kuraray Co., Ltd., Kurashiki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,081

(22) Filed: Dec. 31, 1997

(30) Foreign Application Priority Data

Jan. 10, 1997 (JP) .............................................. 9-014658
Jan. 10, 1997 (JP) .............................................. 9-014659

(51) Int. Cl.⁷ .............................................. B65D 41/00
(52) U.S. Cl. ..................... 428/36.6; 428/35.7; 428/36.8; 525/57
(58) Field of Search ........................... 525/57; 524/505, 524/503; 428/35.7, 36.8, 36.6

(56) References Cited

U.S. PATENT DOCUMENTS

| 5,033,476 | A | * | 7/1991 | Kasai ........................ 128/764 |
| 5,045,594 | A | * | 9/1991 | Samuel et al. ................. 525/57 |
| 5,183,848 | A | * | 2/1993 | Samuel et al. ................. 525/57 |
| 5,186,991 | A | * | 2/1993 | Samuel et al. ............. 428/35.8 |
| 5,362,531 | A | * | 11/1994 | Samuel et al. ............. 428/36.6 |
| 5,430,098 | A | * | 7/1995 | Samuel et al. ................. 525/57 |

FOREIGN PATENT DOCUMENTS

| EP | 0 572 667 | 12/1993 |
| JP | 1-313552 | 12/1989 |
| JP | 3-277642 | 12/1991 |
| JP | 5-212104 | 8/1993 |
| JP | 5-295053 | 11/1993 |
| JP | 7-118492 | 5/1995 |
| JP | 7-188509 | 7/1995 |

OTHER PUBLICATIONS

Patent Abstracts of Japan, vol. 095, No. 010, Nov. 30, 1995, JP 07 788509, Jul. 25, 1995.
Patent Abstracts of Japan, vol. 095, No. 004, May 31, 1995, JP 07 003089, Jan. 6, 1995.
Patent Abstracts of Japan, vol. 014, No. 115 (C–0696), Mar. 5, 1990, JP 01 315442, Dec. 20, 1989.

* cited by examiner

Primary Examiner—Judy M. Reddick
(74) Attorney, Agent, or Firm—Oblon, Spivak, McClelland, Maier & Neustadt, P.C.

(57) ABSTRACT

A resin composition comprising (A) a polyolefin resin, (B) a vinyl alcohol copolymer and (C') a block copolymer composed of a polymer block of an aromatic vinyl compound and an isobutylenic polymer block, the weight ratio of (A) to (B) ranging from 100/10 to 100/1000 and the weight ratio of (C') to [(A)+(B)] ranging from 5/100 to 1000/100 is a flexible resin material having high gas barrier properties, good heat resistance and good moldability or formability so that it is useful as a material for various molded or formed articles. In addition, a closure (cap, stopper or the like) for containers or a sealing element (packing element) for the closure for containers which is formed of a resin composition comprising (A) a polyolefin resin, (B) a vinyl alcohol copolymer and (C) an elastomer, the weight ratio of (A) to (B) ranging from 100/10 to 100/1000 and the weight ratio of (C) to [(A)+(B)] ranging from 5/100 to 100/100 has good hermetical sealing properties and good mountability onto (or within) a container and is also excellent in the long-term shelf stability of contents.

10 Claims, No Drawings

RESIN COMPOSITION AND USAGE THEREOF

BACKGROUND OF THE INVENTION

1. Field of the Invention

This invention relates to a flexible resin composition having high gas-barrier properties and good heat-resistance and good moldability or formability and also to a molded or formed article making the best use of the gas barrier properties, heat resistance and flexibility each derived from the raw material resin composition. The molded or formed article according to the present invention has excellent gas barrier properties and heat resistance and also good flexibility so that it is useful as a sealing material, packaging film, container or the like. Owing good moldability or formability (particularly, extrusion formability), the resin composition of the present invention is useful as a component of the above-described molded or formed article.

The present invention also pertains to a closure for containers and a sealing element for the closure. The closure and sealing element according to the present invention are each formed of a material having suitable flexibility and also excellent gas barrier properties and oil resistance so that they have good mountability onto (or within) containers and hermetical sealing properties and also being excellent in long-term shelf stability and smell retention of the content.

2. Related Art of the Invention

A polyvinyl chloride resin having a plasticizer added thereto is used as a sealing material, packaging film, container or the like because of having excellent flexibility and gas barrier properties. The polyvinyl chloride resin however evolves gases such as hydrogen chloride upon disposal by incineration and there is a possibility of its bringing about adverse effects on the environment. In addition, since the plasticizer is apt to cause the bleed out, such a plasticizer-added resin used for a packaging film or container may potentially contaminate the contents. Moreover, it has not so high heat resistance.

Since an ethylene-vinyl alcohol copolymer has high barrier properties against various gases and organic liquids and does not emit harmful gases upon disposal by incineration different from a polyvinylidene chloride resin or polyvinyl chloride resin, its application to various fields such as food packaging has been developed. For example, the use of it as a food packaging material making use of high gas barrier properties is now actualized or under investigation. The ethylene-vinyl alcohol copolymer is however inferior in flexibility so that it is sometimes used as a composition with a soft resin such as polyolefin. The ethylene-vinyl alcohol copolymer, in general, has low affinity and inferior compatibility with other resins, so the original gas barrier properties and the like of the ethylene-vinyl alcohol copolymer tend to be markedly impaired in such a composition.

It is known that a resin composition composed of a polyolefin resin, an olefin-vinyl alcohol copolymer and a modified copolymer, which has been obtained by graft polymerizing an unsaturated carboxylic acid or derivative thereof to a hydrogenation product of a block copolymer having a polymer block of an aromatic vinyl compound and a conjugated diene polymer block, has excellent gas barrier properties and is therefore useful as a food packaging material (Japanese Patent Application Laid-Open No. HEI 1-313552). It is also known that a resin composition composed of a polyolefin resin, an ethylene-vinyl alcohol copolymer, a polyolefin modified with an unsaturated carboxylic acid or derivative thereof and a hydrogenation product of a block copolymer having a polymer block of an aromatic vinyl compound and a conjugated diene polymer block has excellent gas barrier properties and is therefore useful as a material for bottles, cups and the like (Japanese Patent Application Laid-Open No. HEI 3-277642). In such resin compositions containing a polyolefin resin and a vinyl alcohol copolymer, the above-described modified copolymer introduced from the hydrogenation product of a block copolymer having a polymer block of an aromatic vinyl compound and a conjugated diene polymer block; or the above-described modified polyolefin and the hydrogenation product of a block copolymer having a polymer block of an aromatic vinyl compound and a conjugated diene polymer block are considered to have effects for improving the compatibility between the polyolefin resin and the vinyl alcohol copolymer. In such resin compositions, however, heat resistance is not so high. When the molded or formed article available from such a resin composition is exposed to high temperature conditions for long hours, deterioration occurs and the surface of the article sometimes becomes sticky.

Incidentally, it is described in European Patent Application Publication No. 572,667 that a resin composition comprising 0.5 to 35 parts by weight of a block copolymer having a polymer block of an aromatic vinyl monomer and an isobutylenic polymer block and 100 parts by weight of a thermoplastic resin has improved impact resistance. In it, exemplified as the thermoplastic resin are polycarbonate, polyphenylene ether, polystyrene, polyolefin, polyester, polyvinyl chloride, styrene-methacrylate-acrylonitrile copolymer, methacrylate-styrene copolymer, acrylonitrile-styrene copolymer, polymethyl methacrylate, polyphenylene sulfide and polyvinyl acetate. An ethylene-vinyl alcohol copolymer is not included in the above examples. It is also described in said European Patent Application Publication that the above-described resin composition composed of a thermoplastic resin and a block copolymer has good thermal stability, impact resistance, solvent resistance and compatibility, but a description about gas barrier properties is not included. The gas barrier properties of the above-described resin composition is insufficient in some cases, depending on the application purpose.

In Japanese Patent Application Laid-Open No. HEI 7-118492, described is a thermoplastic resin composition comprising a polyolefin and a block copolymer which is composed of a polymer block of an aromatic vinyl monomer and an isobutylenic polymer block and has a hydroxyl group at least one end of the block copolymer. In Japanese Patent Application Laid-Open No. HEI 7-188509, described are a polymer composition obtained by adding, to a thermoplastic resin such as a polyolefin resin, a specific combination of block copolymers composed of a triblock copolymer which has a structure of a polymer block of an aromatic vinyl monomer—an isobutylenic polymer block—a polymer block of an aromatic vinyl monomer and a diblock copolymer which has a structure of a polymer block of an aromatic vinyl monomer—an isobutylenic polymer block (or a triblock copolymer having a structure of an isobutylenic polymer block—a polymer block of an aromatic vinyl monomer—an isobutylenic polymer block); and also a crown liner formed of said polymer composition. In the above Japanese patent applications, it is described that a composition having excellent flexibility and moldability or formability can be prepared, but the gas barrier properties of the resulting composition are insufficient in some cases, though depending on the application purpose. In these applications, there is no description about the incorporation of a vinyl alcohol copolymer.

As conventional molding materials for producing a closure (cap, stopper or the like) for containers and a sealing element (packing element) for the closure, a resin having suitable flexibility such as polyvinyl chloride resin and low-density polyethylene has generally be used. Also a resin composition having flexibility imparted by the addition of an elastomer or softener to a polyolefin resin such as high-density polyethylene or polypropylene has been employed as the molding material. However the closure or sealing element comprising a polyvinyl chloride resin may potentially contaminate the contents due to the bleed out of the remaining monomers and plasticizers under some conditions of the contents and the environment for use. Because the closure or the like comprising low-density polyethylene has poor gas barrier properties, it is inferior in the long-term shelf stability of contents. The closure or the like comprising the above-described resin composition of a polyolefin blended with a softener may potentially contaminate the contents due to the bleed out of the softener under some conditions of the contents, the environment for use and the like. Furthermore, in the closure or the like comprising the above-described resin composition obtained by adding an elastomer to a polyolefin resin, the incorporation of the elastomer causes a marked deterioration in gas barrier properties, leading to inferior long-term shelf stability of contents. In such a case, an amount of the elastomer added to the polyolefin resin is sometimes controlled to a small amount and the shortage in flexibility caused by the reduction in the amount of the elastomer is made up for by the addition of a softener in combination, involving the contamination problem described above.

In Japanese Patent Application Laid-Open No. HEI 5-295053, it is described that a composition for a sealing material, which comprises 100 parts by weight of a block copolymer containing a polymer block of an aromatic vinyl monomer and an isobutylenic polymer block and 0 to 80 parts by weight of other blending agents, has high gas barrier properties and flexibility derived from said block copolymer and that the composition is used for example as a lid member for sealing bottles. Furthermore, in Japanese Patent Application Laid-Open No. HEI 5-212104, proposed is the production of a sealing article for medicinal or medical use which is conventionally made of a rubber material by using such a block copolymer. Examples of such an article include rubber stopper for pharmaceutical agents, rubber stopper for blood sampling tubes and syringe cap working also as a container for filling pharmaceutical solutions. It is also described in the latter application that the sealing article for medicinal or medical use formed using said block copolymer is excellent in flexibility, gas barrier properties and elution-free properties and that a thermoplastic polymer such as a block copolymer of ethylene and propylene can be added to said block copolymer. Sealing materials as described above each of which is composed mainly of a block copolymer containing a polymer block of an aromatic vinyl monomer and an isobutylenic polymer block have excellent gas barrier properties and at the same time have high flexibility. The present inventors have made attempts to mold the above sealing material into a closure or a sealing element for the closure and then to seal a container by using them. However, it has been found that when a threaded cap integrally molded from the sealing material is mounted onto a container, the slide of the cap in contact with the container is so poor because of too high flexibility of the cap that excess strength is needed for the mounting thereof. Furthermore, it has been found that when a threaded cap mounted with a packing element molded from the sealing material is to be mounted onto a container, the slide of the cap in contact with the container is so poor because of too high flexibility of the packing element that the back motion readily occurs, whereby complete sealing is not readily achieved. Furthermore, the oil resistance of the sealing material is not so high. The gas barrier properties of the sealing material are insufficient in some cases, though depending on the application purpose. Based on these findings, the inventors have found that the closure and sealing element each comprising a material composed mainly of the block copolymer are applicable in a narrow range of field in practical use and that the closure and sealing element are only used for specific applications.

SUMMARY OF THE INVENTION

A first object of the present invention is to provide a resin material which has high gas barrier properties and heat resistance, can exhibit good flexibility even without the addition of a plasticizer, and is equipped with good formability or moldability.

A second object of the present invention is to provide a molded or formed article having high gas barrier properties and heat resistance and at the same time, having good flexibility even when a plasticizer is not added.

A third object of the present invention is to provide a closure for containers which is equipped with a sealing element and has good hermetical sealing properties and mountability onto (or within) a container, said sealing element being formed of a resin material which has suitable flexibility and excellent gas barrier properties and oil resistance without any component presumably causing bleed out.

A fourth object of the present invention is to provide a sealing element for a closure for containers which is formed of a resin material having suitable flexibility and excellent gas barrier properties and oil resistance without any component presumably causing bleed out, and has good hermetical sealing properties and mountability onto (or within) a container.

According to the present invention, the first object described above can be achieved by providing a resin composition, (1) which comprises as principal components (A) a polyolefin resin, (B) a vinyl alcohol copolymer and (C') a block copolymer composed of a polymer block of an aromatic vinyl compound and an isobutylenic polymer block; (2) said component (B) being contained in an amount of 10 to 1000 parts by weight per 100 parts by weight of the component (A) and said component (C') being contained in an amount of 5 to 1000 parts by weight per 100 parts by weight, in total, of the components (A) and (B).

According to the present invention, the second object described above can be achieved by providing a molded or formed article composed of the above resin composition.

According to the present invention, the third object descried above can be achieved by providing a closure, (1) which is a closure for a container, and (2) wherein at least a sealing element thereof is formed of a resin composition comprising as principal components (A) a polyolefin resin, (B) a vinyl alcohol copolymer and (C) an elastomer; said component (B) being contained in an amount of 10 to 1000 parts by weight per 100 parts by weight of the component (A) and said component (C) being contained in an amount of 5 to 100 parts by weight per 100 parts by weight, in total, of the components (A) and (B).

According to the present invention, the fourth object described above can be achieved by providing a sealing element (1) which is a sealing element for a closure for a container and (2) is formed of a resin composition comprising as principal components (A) a polyolefin resin, (B) a vinyl alcohol copolymer and (C) an elastomer; said component (B) being contained in an amount of 10 to 1000 parts by weight per 100 parts by weight of the component (A) and said component (C) being contained in an amount of 5 to 100 parts by weight per 100 parts by weight, in total, of the components (A) and (B).

DETAILED DESCRIPTION OF THE INVENTION

A description will next be made of a resin composition of the present invention comprising as principal components the above-described components (A), (B) and (C') and a molded or formed article made of said resin composition.

Examples of the polyolefin resin to be used as the component (A) in the present invention include a homopolymer of an olefin monomer such as high-density polyethylene, low-density polyethylene and polypropylene; and copolymers of at least two monomers such as ethylene-propylene random copolymer, ethylene-propylene block copolymer, ethylene-1-butene copolymer, ethylene-1-hexene random copolymer and ethylen-1-octene copolymer. Incidentally, the polyolefin resin (A) is not limited to any single polyolefin resin. Depending on the application purpose, two or more polyolefin resins may be used in combination.

The vinyl alcohol copolymer to be used as the component (B) in the present invention is a copolymer containing a vinyl alcohol unit [—$CH_2$—CH(OH)—], which can be obtained, for example, but not limited to, by partial or complete saponification of a corresponding vinyl ester copolymer.

As the vinyl alcohol copolymer (B), an olefin-vinyl alcohol copolymer is preferred. As the olefin-vinyl alcohol copolymer, a saponification product of an olefin-vinyl carboxylate ester copolymer is preferred. As the saponification product of the olefin-vinyl carboxylate ester copolymer, preferred are those obtained by saponification of an olefin-vinyl carboxylate ester copolymer containing olefin units and vinyl carboxylate ester units in a molar ratio ranging from 0.5/99.5 to 99.5/0.5, thereby converting 10 to 100 mole % of the vinyl carboxylate ester units to vinyl alcohol units. From the viewpoints of the gas barrier properties and moldability or formability of the resin composition with the polyolefin resin (A) and the block copolymer (C'), the content of an olefin unit in the saponification product of an olefin-vinyl carboxylate ester copolymer is preferably 2 to 70 mole %, with 5 to 65 mole % being more preferred and with 10 to 60 mole % being particularly preferred. The saponification degree in the saponification product of an olefin-vinyl carboxylate ester copolymer, that is, a conversion ratio of the vinyl carboxylate ester units to vinyl alcohol units, is preferably at least 90 mole %, with at least 95 mole % being more preferred and at least 98 mole % being particularly preferred, judging from the gas barrier properties and heat resistance of the resin composition obtained from it. The melt flow rate in the vinyl alcohol copolymer (B) as measured according to the method described in ASTM D1238 under the conditions of a temperature of 190° C. and a load of 2.16 kg is preferably 0.1 to 100 g/10 min, with 0.5 to 50 g/10 min being more preferred and 1 to 40 g/10 min being particularly preferred from the viewpoints of the moldability or formability of the resin composition obtained from the copolymer.

Among the saponification products of an olefin-vinyl carboxylate ester copolymer, the saponification product of an ethylene-vinyl carboxylate ester copolymer is particularly preferred from the viewpoints of moldability or formability and mechanical properties of the resin composition with a polyolefin resin (A) and a block copolymer (C'). The saponification product of an ethylene-vinyl carboxylate ester copolymer may contain another structural unit in addition to the ethylene unit and vinyl alcohol unit insofar as its amount is small (preferably, 10 mole % or smaller based on the total structural units). Examples of another structural unit include those derived from α-olefins such as propylene, isobutylene, 4-methylpentene-1, 1-hexene and 1-octene; vinyl carboxylate esters such as vinyl acetate, vinyl propionate, vinyl versatate and vinyl pivalate; unsaturated carboxylic acids or derivatives thereof (ex. salt, ester, nitrile, amide and anhydride) such as itaconic acid, acrylic acid and maleic anhydride; vinyl silane compounds such as vinyl (trimethoxy)silane; unsaturated sulfonic acids or salts thereof; and N-methylpyrrolidone. The saponification product of an ethylene-vinyl carboxylate ester copolymer may have a functional group such as alkylthio at the terminal of its molecular chain. Among the saponification products of an ethylene-vinyl carboxylate ester copolymer, that of an ethylene-vinyl acetate copolymer is particularly preferred.

The saponification product of an olefin-vinyl carboxylate ester copolymer can be prepared, for example, in a manner known per se in the art by preparing an olefin-vinyl carboxylate ester copolymer and then saponifying the copolymer. The olefin-vinyl carboxylate ester copolymer can be prepared, for example, by polymerizing a monomer composed mainly of an olefin and a vinyl carboxylate ester under pressure in the presence of a radical polymerization initiator such as benzoyl peroxide or azobisisobutyronitrile in an organic solvent such as methanol, t-butyl alcohol or dimethylsulfoxide. Upon the saponification of an olefin-vinyl carboxylate ester copolymer, an acid catalyst or an alkali catalyst can be used.

The vinyl alcohol copolymer (B) is not limited to any single use of a vinyl alcohol copolymer. Depending on the application purpose, two or more vinyl alcohol copolymers may be used in combination.

The block copolymer used in the present invention as the component (C') contains a polymer block (a) of an aromatic vinyl compound and an isobutylenic polymer block (b).

Here, the block (a) is a polymer block derived from a monomer composed mainly of an aromatic vinyl compound. As the aromatic vinyl compound, styrene, p-methylstyrene, α-methylstyrene and the like can be used either singly or in combination. The block (a) preferably has a number-average molecular weight falling within a range of 3000 to 80000.

The block (b) is, on the other hand, a polymer block derived from a monomer composed mainly of isobutylene. The number-average molecular weight of the block (b) preferably falls within a range of 10000 to 200000, because such a range improves the melt fluidity of the block copolymer (C') and facilitates the mixing with the polyolefin resin (A) and vinyl alcohol copolymer (B) and subsequent molding or forming. In addition, it is preferred that in the block copolymer (C'), the whole weight of the block (a) falls within a range of 10 to 60% based on the total weight of the block (a) and the block (b).

The block copolymer (C') is not limited to any single block copolymer. Depending on the application purpose, two or more block copolymers may be used in combination.

No particular limitation is imposed on the process for the preparation of the block copolymer (C'). For example, it is possible to employ a method in which polymerization of a monomer composed mainly of an aromatic vinyl compound and polymerization of a monomer composed mainly of isobutylene are carried out successively in an inert solvent such as hexane or methylene chloride in the presence of an initiator system composed of a Lewis acid and an organic compound capable of forming a cationic-polymerizable active species in combination with the Lewis acid. Here, examples of the Lewis acid include titanium tetrachloride, boron trichloride, aluminum chloride and tin tetrachloride. The organic compound capable of forming a cationic-polymerizable active species means an organic compound having a functional group such as an alkoxy group, an acyloxy group or a halogen atom and examples thereof include bis(2-methoxy-2-propyl)benzene, bis(2-acetoxy-2-propyl)benzene and bis(2-chloro-2-propyl)benzene. If necessary, pyridine and amides such as dimethylacetamide and dimethylformamide may be added to the polymerization reaction system. According to the above polymerization method, the triblock copolymer having a structure of block (a)-block (b)-block (a) may be produced for example by polymerizing a monomer principally composed of isobutylene in the presence of an initiator system comprising a Lewis acid and an organic compound having two functional groups, and adding a monomer principally comprising an aromatic vinyl compound to the polymerization reaction system when the above polymerization reaction is substantially completed, whereby the polymerization reaction can be continued sequentially.

The resin composition of the present invention contains the vinyl alcohol copolymer (B) in an amount of 10 to 1000 parts by weight per 100 parts by weight of the polyolefin resin (A); and contains the block copolymer (C') in an amount of 5 to 1000 parts by weight per 100 parts by weight in total of the polyolefin resin (A) and vinyl alcohol copolymer (B). If the content of the vinyl alcohol copolymer (B) is less than 10 parts by weight per 100 parts by weight of the polyolefin resin (A), the resulting resin composition is limited in the ultimate level of the gas barrier properties, though depending on the kind of the polyolefin resin (A) (for example, when the polyolefin resin (A) is a low-density polyethylene). When the content of the vinyl alcohol copolymer (B), on the other hand, exceeds 1000 parts by weight per 100 parts by weight of the polyolefin resin (A), the resulting resin composition sometimes has insufficient flexibility. If the content of the block copolymer (C') is less than 5 parts by weight of per 100 parts by weight in total of the polyolefin resin (A) and vinyl alcohol copolymer (B), the flexibility of the resulting resin composition is insufficient. If the content of the block copolymer (C'), on the other hand, exceeds 1000 parts by weight per 100 parts by weight in total of the components (A) and (B), the resulting resin composition has too high flexibility and is therefore not suited as a material for the molded or formed article which is requested to have self-shape maintaining properties and the like.

For attaining both suitable flexibility as molding or forming materials and markedly high gas barrier properties, it is preferred that the content of the vinyl alcohol copolymer (B) is 20 to 500 parts by weight per 100 parts by weight of the polyolefin resin (A) and the content of the block copolymer (C') is 10 to 50 parts by weight per 100 parts by weight in total of the polyolefin resin (A) and vinyl alcohol copolymer (B).

In the present invention, another component, in addition to the polyolefin resin (A), vinyl alcohol copolymer (b) and block copolymer (C'), may be added to the resin composition as needed within an extent not impairing the advantages of the present invention. An inorganic filler such as calcium carbonate, talc, carbon black, titanium oxide, silica, clay, barium sulfate or magnesium carbonate can be added for the improvement of the heat resistance and weather resistance and a weight increase. An aliphatic hydrocarbon lubricant such as polyolefin wax, higher aliphatic alcohol, higher fatty acid lubricant, fatty acid amide lubricant such as an amide or bisamide of a higher fatty acid or metallic soap base lubricant such as calcium stearate can be added for the improvement of the surface lubricating properties of the molded or formed article obtained from the resin composition. In addition, a thermal stabilizer, antioxidant or light stabilizer can be added.

No particular limitation is imposed on the mixing method of the components for the preparation of a resin composition of the present invention. A method similar to that ordinarily employed for the preparation of a polyolefin resin composition can be employed.

When a method in which the polyolefin resin (A), vinyl alcohol copolymer (B) and block copolymer (C') are mixed under the melting conditions is adopted, the resulting resin composition has further improved gas barrier properties so that this method is preferably adopted. When the above mixing method under the melting conditions is adopted, it is preferred to use the components (A), (B) and (C') which can satisfy the conditions of [a]>[b] and [c']>[b] supposing that [a], [b] and [c'] represent the melt viscosities of the components (A), (B) and (C'), respectively, as measured at a temperature similar to that in the above melting conditions and a shear rate of 100 sec$^{-1}$, because a resin composition with particularly high gas barrier properties can be provided. As a method for mixing the components (A), (B) and (C') under the melting conditions, usable is a method comprising melt mixing these components in a predetermined ratio by a melt kneader such as extruder or kneader. As a heating temperature upon mixing under the above melting conditions, any temperature permitting the melt flow of the components and not causing a substantial thermal deterioration can be used. In general, a temperature ranging from 150 to 300° C., more preferably, 180 to 280° C. can be adopted.

The resin composition according to the present invention has good formability or moldability so that it can be formed or molded into an article having a desired size or shape by various forming or molding methods. Examples of the forming or molding method which can be adopted include injection molding, extrusion, compression molding, blow molding and vacuum forming in a manner known per se in the art. Examples of the formed or molded article include sheets, films, pipes and bottle-shaped articles. The resin composition of the present invention can exhibit excellent formability when subjected to melt extrusion, particularly melt extrusion film forming, which makes it possible to provide an article having good surface conditions.

The article molded or formed from the resin composition of the present invention has a suitable flexibility, good heat resistance and high gas barrier properties, so that it is useful as various sealing materials, packaging films and containers.

A closure for a container and a sealing element for the closure according to the present invention, each composed mainly of the above-described components (A), (B) and (C) will hereinafter be described.

A detailed description was already made on the components (A) and (B), but it is preferred that the content of olefin units in the saponification product of an olefin-vinyl carboxylate ester copolymer, which is a preferred example of the vinyl alcohol copolymer (B), is 2 to 70 mole %, more preferably 5 to 65 mole % and particularly preferably 10 to 60 mole %, from the viewpoints of the gas barrier properties and moldability or formability of a material composed of the resin composition with the polyolefin resin (A) and elastomer (C). Among the saponification products of an olefin-vinyl carboxylate ester copolymer, that of an ethylene-vinyl carboxylate ester copolymer is particularly preferred from the viewpoints of the moldability or formability and mechanical properties of the material formed from the resin composition with the polyolefin resin (A) and elastomer (C).

Examples of the elastomer (C) include the above-described block copolymer (C') (ex. a styrene-isobutylene-styrene triblock copolymer or the like); a block copolymer containing a polymer block of an aromatic vinyl compound and a conjugated diene polymer block which may be at least partially hydrogenated (ex. styrene-ethylene-butylene-styrene triblock copolymer (SEPS), styrene-ethylene propylene-styrene triblock copolymer (SEPS) or the like), ethylene-vinyl acetate copolymer; ethylene-propylene rubber (ex. EPR or EPDM), ethylene-1-butene copolymer, ethylen-1-octene copolymer, styrene-conjugated diene copolymer or hydrogenated product thereof, carboxyl- or epoxy-modified styrene-conjugated diene copolymer and butadiene-acrylonitrile copolymers having at an terminal thereof a carboxyl or epoxy group.

Among them, thermoplastic elastomers such as the block copolymer (C') and a block copolymer comprising a polymer block of an aromatic vinyl compound and a conjugated diene polymer block which may be at least partially hydrogenated are preferred. Particularly, the block copolymer (C') is preferred because the resin composition containing it with the polyolefin resin (A) and the vinyl alcohol copolymer (B) exhibits good formability on extrusion and in addition, it exhibits excellent heat resistance so that when it is molded or formed into a closure or a sealing element, deterioration such as change on the surface hardly occurs even after exposed to high-temperature conditions for long time. Here the block (a) of the block copolymer (C') is a polymer block derived from a monomer mainly composed of an aromatic vinyl compound. Examples of the aromatic vinyl compound include styrene, p-methylstyrene and α-methylstyrene; and they can be used singly or in combination. The block (a) is preferred to have a number-average molecular weight falling within a range of 3000 to 80000. The block (b), on the other hand, is a polymer block derived from a monomer composed mainly of isobutylene. Number-average molecular weight of the block (b) falling within a range of 10000 to 200000 is preferred because it improves the melt fluidity and facilitates the mixing with the polyolefin resin (A) and vinyl alcohol copolymer (B) and subsequent molding or forming. It is also preferred that the total weight of the block (a) in the block copolymer falls within a range of 10 to 60% based on the total weight of the blocks (a) and (b) in the block copolymer.

The elastomer (C) is not limited to any single elastomer. Depending on the application purpose, two or more elastomers may be used in combination.

In the resin composition forming a closure or sealing element according to the present invention, the content of the vinyl alcohol copolymer (B) is 10 to 1000 parts by weight per 100 parts by weight of the polyolefin resin (A). The content of the elastomer (C) is 5 to 100 parts by weight per 100 parts by weight in total of the polyolefin resin (A) and vinyl alcohol copolymer (B).

When the content of the vinyl alcohol copolymer (B) is less than 10 parts by weight per 100 parts by weight of the polyolefin resin (A), the resulting resin composition reaches only a limited level of gas barrier properties and a closure or sealing element formed thereof is insufficient in the long-term shelf stability and smell retention of the contents. When the content of the vinyl alcohol copolymer (B) exceeds 1000 parts by weight per 100 parts by weight of the polyolefin resin (A), on the other hand, the resulting resin composition has insufficient flexibility and the closure or sealing element formed thereof is sometimes inferior in the hermetical sealing properties for containers.

If the content of the elastomer (C) is less than 5 parts by weight per 100 parts by weight in total of the polyolefin resin (A) and vinyl alcohol copolymer (B), the resulting resin composition has insufficient flexibility and the closure or sealing element composed of the resin composition is inferior in the hermetical sealing properties for containers. If the content of the elastomer (C) exceeds 100 parts by weight per 100 parts by weight in total of the above components (A) and (B), on the other hand, the resulting resin composition tends to have too high flexibility. Such a resin composition containing an excess of the elastomer (C) is molded into a closure secured by rotation via a screw and the like, the slide thereof in contact with a container is so deteriorated that it will be difficult to mount the closure onto the container via rotation. When a sealing element molded or formed from the resin composition is mounted within a closure secured by rotation for use, the back motion occurs when a screw locks into the opening of a container and complete sealing cannot be attained easily. Because a resin composition containing an excess of the elastomer (C) has low oil resistance, a closure or sealing element formed of the resin composition is applicable only in a limited range of fields.

It is preferred that the content of the vinyl alcohol copolymer (B) is 20 to 500 parts by weight per 100 parts by weight of the polyolefin resin (A) and the content of the elastomer (C) is 10 to 50 parts by weight per 100 parts by weight in total of the polyolefin resin (A) and vinyl alcohol copolymer (B), because when a closure or sealing element is molded or formed from such a composition, the above-described problems are overcome, it exhibits suitable flexibility, which brings about improvements in both the mountability to the container and hermetically sealing properties, and in addition it has excellent oil resistance.

In the closure or sealing element according to the present invention, it is possible to add another component to the raw material resin composition as needed, in addition to the polyolefin resin (A), vinyl alcohol copolymer (B) and elastomer (C) within an extent not impairing the advantages of the present invention. An inorganic filler such as calcium carbonate, talc, carbon black, titanium oxide, silica, clay, barium sulfate or magnesium carbonate can be added for the improvements of heat resistance and weather resistance and an increase in weight. An aliphatic hydrocarbon lubricant such as polyolefin wax, higher aliphatic alcohol, higher fatty acid lubricant, fatty acid amide lubricant such as an amide or bisamide of a higher fatty acid or metallic soap base lubricant such as calcium stearate can be added for the further improvement of lubricating properties of the closure or sealing element molded or formed from the resin composition. Besides, a thermal stabilizer, antioxidant or light stabilizer and the like may be blended as well.

No particular limitation is imposed on the mixing method of the components for the preparation of the above-described resin composition. A method similar to that ordinarily employed for the preparation of a polyolefin resin composition can be employed.

When a method in which the polyolefin resin (A), vinyl alcohol copolymer (B) and elastomer (C) are mixed under the melting conditions is adopted, the resulting resin composition (also a closure or sealing element available therefrom) has further improved gas barrier properties so that this method is preferably adopted. When the above mixing method under the melting conditions is adopted, it is preferred to use the components (A), (B) and (C) which can satisfy the conditions of [a]>[b] and [c]>[b] supposing that [a], [b] and [c] represent the melt viscosities of the components (A), (B) and (C), respectively, as measured at a temperature similar to that in the above melting conditions and a shear rate of 100 sec$^{-1}$, which makes it possible to provide the resulting resin composition (and also the closure or sealing element available therefrom) with particularly high gas barrier properties. As a method of mixing the individual components under the melting conditions, usable is a method comprising melt mixing these components in a predetermined ratio by a melt kneader such as extruder or kneader. As a heating temperature upon mixing under the above melting conditions, any temperature permitting the melt flow of the components and not causing a substantial thermal deterioration is usable. In general, the temperature ranging from 150 to 300° C., more preferably, 180 to 280° C. can be adopted.

The resulting resin composition can be molded or formed into a closure or sealing element of a desired shape or size in a manner known per se in the art. For example, a closure integral to a sealing element may be produced by injection molding of the resin composition into a given shape. A sealing element independent of the body of a closure may be produced according to a method comprising punching a sheet or film, which is produced from the resin composition by a forming method such as extrusion, by means of a blanking die and the like. The sealing element thus produced can be mounted onto the body of a closure by a method such as thermal fusion, for subsequent use. The sealing element of the present invention may also be produced by melt extruding and compression molding the resin composition onto the body of a closure comprising a different type of a material (for example, metal).

At least the sealing element of the closure of the present invention comprises the resin composition; the closure embraces not only an integrally molded article of the resin composition but also a closure with a sealing element formed or molded from the resin composition as a structural member thereof. The closure of the present invention embraces a variety of shapes such as cap and stopper. The suitable pliability of the resin composition is effectively exerted particularly in those secured by rotation via a screw and the like. The sealing element (packing element) of the present invention includes a variety of shapes such as disk and ring.

The present invention will hereinafter be described more concretely in examples. It should however be borne in mind that the present invention is not limited to or by the following examples.

The measurement of the melt viscosity of each of the components of a resin composition and evaluation of the resin composition were carried out according to the methods described in (1) to (6).
(1) Melt Viscosity The melt viscosity of each component of a resin composition was measured by a capillary rheometer ("CAPIROGRAPH 1C", trade name; product of Toyo Seiki Seisaku-sho, Ltd.) at a shear rate of 100 sec$^{-1}$ and a temperature equal to that upon melt kneading for the preparation of the resin composition.

(2) Flexibility

A resin composition was compression molded into a sheet having a thickness of 6 mm at a temperature higher by 20° C. than the melt temperature. The hardness (Shore D) of the resulting sheet was measured in accordance with JIS K7215. Concerning the sheet having the Shore D hardness not higher than 35, hardness (JIS A) was measured in accordance with JIS K6301 as needed. The hardnesses so obtained were designated as a flexibility index.
(3) Heat Resistance of a Molded Product A resin composition was compression molded into a test sheet of 20 cm long, 20 cm wide and 2 mm thick. The test piece was placed in a gear oven of 150° C. for 24 hours, followed by cooling to room temperature. Stickiness on the surface of the test piece was observed by touching it with a finger. When stickiness was not observed as before heating, the sheet was ranked as "excellent" (A); when almost no stickiness was observed, "good" (B); when slight stickiness was observed, "slightly poor" (C); and when severe stickiness was observed, "poor" (D). Thus, the heat resistance was evaluated by judging the thermal deterioration in accordance with the above four-stage system.
(4) Gas Barrier Properties A resin composition was compression molded into a film having a thickness of 200 μm at a temperature higher by 20° C. than the melt temperature. The oxygen permeability coefficient, namely Po$_2$, of the film was measured under the conditions of a 2.5 kg/cm$^2$ oxygen pressure and a temperature of 35° C. by using a gas permeation measurement system ("Type GTR-10", trade name; product of Yanagimoto Mfg. Co., Ltd.). The coefficient was designated as an indicator of gas barrier properties.
(5) Film Formability A resin composition was formed into a film by 20 mmØ LABOPLASTMILL (manufacture of TOYO SEIKI SEISAKU-SHO, LTD.) under the conditions of a temperature of 230° C. and a rotational speed of a screw of 100 rpm. The surface roughness of the resulting film was visually observed. When the film had a markedly smooth surface, it was ranked as "excellent" (A); when it had a slightly rough surface, "good" (B); and when it has a rough surface as fish skin, "poor" (C). Thus, the film formability was evaluated by ranking the surface conditions of the film at the above three grades.
(6) Oil Resistance A resin composition was compression molded into a disk test piece having a thickness of 6 mm and a diameter of 50 mm at a temperature higher by 20° C. than the melt temperature. After immersed in a vegetable oil for 7 days, the test piece was drawn out to judge the appearance. When no change was observed in the appearance, it was judged as "good" (A); and when appearance of the surface roughness was observed, it was judged as "poor" (B). Thus, the oil resistance was evaluated by judging the surface conditions at the above two stages.

The polyolefin resins used in the Examples will be represented by the following abbreviations:
Polyolefin resin (A-1): low-density polyethylene ("MIRASON 401", trade name; product of MITSUI PETROCHEMICAL INDUSTRIES, LTD.)
Polyolefin resin (A-2): propylene-ethylene block copolymer ("Mitsubishi Polypropylene BC3", trade name; product of Mitsubishi Chemical Corporation)
Polyolefin resin (A-3): low-density polyethylene ("MIRASON 68", trade name; product of MITSUI PETROCHEMICAL INDUSTRIES, LTD.)
Polyolefin resin (A-4): low-density polyethylene ("MIRASON B319", trade name; product of MITSUI PETROCHEMICAL INDUSTRIES, LTD.)

Polyolefin resin (A-5): ethylen-1-octene copolymer ("ENGAGE EG8200", trade name; product of THE DOW CHEMICAL COMPANY)

The vinyl alcohol copolymers used in the Examples will be represented by the following abbreviations.

Vinyl alcohol copolymer (B-1): ethylene-vinyl alcohol copolymer ("EVAL EP-E105", trade name; product of KURARAY CO., LTD.)

Vinyl alcohol copolymer (B-2): ethylene-vinyl alcohol copolymer ("EVAL EP-G110", trade name; product of KURARAY CO., LTD.)

The elastomers used in the Examples will be represented by the following abbreviations.

Elastomer (C-1): a triblock copolymer having a structure of a polystyrene block—a polyisobutylene block—a polystyrene block (number average molecular weight: 34000, molecular weight distribution (Mw/Mn): 1.23, polystyrene block content: 30 wt. %).

Elastomer (C-2): a triblock copolymer having a structure of a polystyrene block—a polyisobutylene block—a polystyrene block (number average molecular weight: 75000, molecular weight distribution (Mw/Mn): 1.20, polystyrene block content: 20 wt. %).

Elastomer (C-3): a triblock copolymer having a structure of a polystyrene block—a polyisobutylene block—a polystyrene block (number average molecular weight: 76000, molecular weight distribution (Mw/Mn): 1.27, polystyrene block content: 30 wt. %).

Elastomer (C-4): a triblock copolymer having a structure of a polystyrene block—an ethylene-propylene copolymer block—a polystyrene block ("SEPTON 2007", trade name; product of KURARAY CO., LTD.)

Elastomer (C-5): an ethylen-1-octene copolymer ("ENGAGE EG8200", trade name; product of THE DOW CHEMICAL COMPANY)

Elastomer (C-6): an ethylene-propylene copolymer rubber ("ESPRENE V0111", trade name; product of SUMITOMO CHEMICAL CO., LTD.)

EXAMPLES 1–14

Comparative Examples 1–8

In each of Examples 1 to 14 and Comparative Examples 1 to 8, a polyolefin resin (A), a vinyl alcohol copolymer (B) and an elastomer (C) were preliminary mixed at a ratio as shown in Table 1, followed by kneading in a twin-screw extruder under the melting conditions of a temperature of 220° C., whereby a resin composition was obtained.

Evaluation results of the resin composition so obtained are shown in Table 1.

TABLE 1

|  | Ex. 1 | Ex. 2 | Comp. Ex. 1 | Ex. 3 | Comp. Ex. 2 | Ex. 4 | Ex. 5 | Ex. 6 | Ex. 7 | Ex. 8 | Ex. 9 |
|---|---|---|---|---|---|---|---|---|---|---|---|
| Polyolefin resin (A) (parts by weight) | A-1 40 | A-1 40 | A-1 70 | A-1 60 | A-1 65 | A-2 40 | A-3 40 | A-4 40 | A-4 60 | A-5 30 | A-1 20 |
| Vinyl alcohol copolymer (B) (parts by weight) | B-2 30 | B-1 30 | — 0 | B-1 20 | B-1 5 | B-1 30 | B-1 30 | B-1 30 | B-2 20 | B-2 30 | B-2 20 |
| Elastomer (C) (parts by weight) | C-1 30 | C-3 30 | C-1 30 | C-3 20 | C-3 30 | C-1 30 | C-1 30 | C-3 30 | C-2 20 | C-1 40 | C-1 60 |
| Melt viscosity (order of magnitude) | a > c > b | c > a > b | a > c | c > a > b | c > a > b | c > a > b | c > b > a | a > c > b | a > c > b | a > c > b | a > c > b |
| Hardness (Shore D) | 42 | 42 | 40 | 44 | 42 | 52 | 44 | 48 | 49 | 35 or less | 35 or less |
| (JIS A) | — | — | — | — | — | — | — | — | — | 83 | 75 |
| Oxygen permeability coefficient (cc · 20 μm/m² · day · atm) | 360 | 380 | 12000 | 2400 | 12000 | 180 | 5800 | 56 | 830 | 800 | 2100 |
| Heat resistance (stickiness) | B | B | B | B | B | B | B | B | B | B | B |
| Film formability (surface condition) | A | B | — | A | — | — | — | B | A | — | — |

|  | Comp. Ex. 3 | Ex. 10 | Ex. 11 | Ex. 12 | Comp. Ex. 4 | Comp. Ex. 5 | Ex. 13 | Comp. Ex. 6 | Ex. 14 | Comp. Ex. 7 | Comp. Ex. 8 |
|---|---|---|---|---|---|---|---|---|---|---|---|
| Polyolefin resin (A) (parts by weight) | A-1 40 | A-1 60 | A-1 40 | A-1 60 | A-1 40 | A-1 40 | A-2 40 | A-3 40 | A-1 20 | A-1 65 | A-1 65 |
| Vinyl alcohol copolymer (B) (parts by weight) | B-2 30 | B-2 20 | B-2 30 | B-2 20 | B-2 30 | B-2 30 | B-2 30 | B-1 30 | B-2 20 | B-2 5 | B-2 5 |
| Elastomer (C) (parts by weight) | C-4 30 | C-1 20 | C-3 30 | C-3 20 | C-5 30 | C-6 30 | C-1 30 | C-4 30 | C-3 60 | C-1 30 | C-4 30 |
| Melt viscosity (order of magnitude) | c > a > b | a > c > b | c > a > b | c > a > b | c > a > b | c > a > b | c > a > b | c > b > a | c > a > b | a > c > b | c > a > b |
| Hardness (Shore D) | 48 | 45 | 43 | 46 | 43 | 43 | 52 | 45 | 31 | 42 | 43 |
| (JIS A) | — | — | — | — | — | — | — | — | — | — | — |
| Oxygen permea- | 440 | 2200 | 420 | 1800 | 560 | 280 | 180 | 5200 | 2300 | 12000 | 14500 |

TABLE 1-continued

| | | | | | | | | | | | |
|---|---|---|---|---|---|---|---|---|---|---|---|
| bility coefficient (cc · 20 μm/ m² · day · atm) | | | | | | | | | | | |
| Heat resistance (stickiness) | C | B | B | B | C | C | B | C | B | B | C |
| Film formability (surface condtion) | C | — | — | | | | | | | | |

Incidentally, in the above table 1, the characters "a", "b" and "c" in the column of "melt viscosity" mean the melt viscosity of a polyolefin resin (A), that of a vinyl alcohol polymer (B) and that of an elastomer (C), respectively.

From Table 1, it has been found that judging from the oxygen permeability coefficient not greater than 5800 cc·20 μm/m²·day·atm, the invention resin compositions prepared in Examples 1 to 14 have excellent gas barrier properties; and from the hardness within a range of 31 to 52 on the Shore D or the hardness both not greater than 35 on the Shore D and not less than 75 on the JIS A, the resin compositions have suitable flexibility as various molding or forming materials. It has also been found that from the results of "B" (good) in the evaluation of heat resistance and the results of "A" (excellent) or "B" (good) in the evaluation of film formability, they are satisfactory both in heat resistance and extrusion formability. Incidentally, as apparent from Table 1, when the melt viscosity (b) of a vinyl alcohol copolymer (B) is smaller than both the melt viscosity (a) of a polyolefin resin (A) and the melt viscosity (c) of an elastomer (C) (Examples 1 to 4 and Examples 6 to 14 among Examples 1 to 14), the oxygen permeability coefficient is 2400 cc·20 μm/m²·day·atm or smaller, which suggests particularly excellent gas barrier properties.

In each of the resin compositions described in Comparative Examples 1, 2, 7 and 8 which do not contain a vinyl alcohol copolymer (B) or contain it in a too small amount and are therefore different from the invention compositions, the oxygen permeability coefficient is not smaller than 12000 cc·20 μm/m²·day·atm, which suggests that the composition has low gas barrier properties. In each of the resin compositions described in Comparative Examples 3 to 6 and 8 which contains an elastomer (C) different from the block copolymer (C'), the heat resistance is evaluated as "C" (poor) and in the resin composition in Comparative Example 3 the film formability is evaluated as "C" (poor). From the above, it has been found that the resin compositions in Comparative Examples 3 to 6 and 8 have insufficient heat resistance and the resin composition in Comparative Example 3 is insufficient also in the film formability.

Referential Examples 1 to 16

Oil resistance of some of the resin compositions obtained in the above Examples and Comparative Examples was evaluated. The results are shown in Table 2, together with the evaluation results already shown in Table 1.

TABLE 2

| Referential Example No. | 1 | 2 | 3 | 4 | 5 | 6 | 7 | 8 |
|---|---|---|---|---|---|---|---|---|
| Corresponding Example or Comp. Ex. | Ex. 2 | Ex. 3 | Ex. 1 | Ex. 10 | Ex. 11 | Ex. 12 | Comp. Ex. 3 | Comp. Ex. 4 |
| Polyolefin resin (A) (parts by weight) | A-1 40 | A-1 60 | A-1 40 | A-1 60 | A-1 40 | A-1 60 | A-1 40 | A-1 40 |
| Vinyl alcohol copolymer (B) (parts by weight) | B-1 30 | B-1 20 | B-2 30 | B-2 20 | B-2 30 | B-2 20 | B-2 30 | B-2 30 |
| Elastomer (C) (parts by weight) | C-3 30 | C-3 20 | C-1 30 | C-1 20 | C-3 30 | C-3 20 | C-4 30 | C-5 30 |
| Melt viscosity (order of magnitude) | c > a > b | c > a > b | a > c > b | a > c > b | c > a > b | c > a > b | c > a > b | c > a > b |
| Hardness (Shore D) | 42 | 44 | 42 | 45 | 43 | 46 | 48 | 43 |
| Oxygen permeability coefficient (cc · 20 μm/ m² · day · atm) | 380 | 2400 | 360 | 2200 | 420 | 1800 | 440 | 560 |
| Oil resistance (change in appearance) | A | A | A | A | A | A | A | A |
| Heat resistance (stickiness) | B | B | B | B | B | B | C | C |

| Referential Example No. | 9 | 10 | 11 | 12 | 13 | 14 | 15 | 16 |
|---|---|---|---|---|---|---|---|---|
| Corresponding Example or Comp. Ex. | Comp. Ex. 5 | Ex. 13 | Ex. 5 | Comp. Ex. 6 | Ex. 9 | Ex. 14 | Comp. Ex. 7 | Comp. Ex. 8 |
| Polyolefin resin (A) (parts by weight) | A-1 40 | A-2 40 | A-3 40 | A-3 40 | A-1 20 | A-1 20 | A-1 65 | A-1 65 |
| Vinyl alcohol copolymer (B) (parts by weight) | B-2 30 | B-2 30 | B-1 30 | B-1 30 | B-2 20 | B-2 20 | B-2 5 | B-2 5 |
| Elastomer (C) (parts by weight) | C-6 30 | C-1 30 | C-1 30 | C-4 30 | C-1 60 | C-3 60 | C-1 30 | C-4 30 |

TABLE 2-continued

| | | | | | | | | |
|---|---|---|---|---|---|---|---|---|
| Melt viscosity (order of magnitude) | c > a > b | c > a > b | c > b > a | c > b > a | a > c > b | c > a > b | a > c > b | c > a > b |
| Hardness (Shore D) | 43 | 52 | 44 | 45 | 32 | 31 | 42 | 43 |
| Oxygen permeability coefficient (cc · 20 $\mu$m/m$^2$ · day · atm) | 280 | 180 | 5800 | 5200 | 2100 | 2300 | 12000 | 14500 |
| Oil resistance (change in appearance) | A | A | A | A | B | B | A | A |
| Heat resistance (stickiness) | C | B | B | C | B | B | B | C |

Incidentally, in the above table 2, the characters "a", "b" and "c" in the column "melt viscosity" mean the melt viscosity of a polyolefin resin (A), that of a vinyl alcohol polymer (B) and that of an elastomer (C), respectively.

From Table 2, it has been found that each of the resin compositions of Referential Examples 1 to 12 has suitable flexibility of about 40 to 55 as the Shore D hardness, excellent gas barrier properties of an oxygen permeability coefficient not greater than 5800 cc·20 $\mu$m/m$^2$·day·atm, and oil resistance judged as "good" in the evaluation of oil resistance, so that it is a suitable raw material for a closure for containers or a sealing element for the closure. Among them, the resin compositions wherein the vinyl alcohol copolymer (B) has a melt viscosity (b) lower than that of the polyolefin resin (A) and also that of the elastomer (C) (Referential Examples 1 to 10) have an oxygen permeability coefficient of 2400 cc·20 $\mu$m/m$^2$·day·atm and are therefore particularly excellent in the gas barrier properties. When a block copolymer (C-1 or C-3) having a polymer block of an aromatic vinyl compound and an isobutylenic polymer block is used as the elastomer (C) (Referential Examples 1 to 6, 10 and 11), the heat resistance is evaluated as "good" (B), which indicates that the heat resistance as well as gas barrier properties is good.

On the other hand, each of the resin compositions of Referential Examples 13 and 14 containing the elastomer (C) in a large amount shows the Shore D hardness of 30 or so, which suggests too high flexibility. It is evaluated as "poor" (B) in the oil resistance evaluation, which suggests insufficient oil resistance. Accordingly, it has been found that these resin compositions are not suited as raw materials for a closure for containers or a sealing element for the closure. Each of the resin compositions of Referential Examples 15 and 16 containing the vinyl alcohol copolymer (B) in a too small amount shows the oxygen permeability coefficient not smaller than 12000 cc·20 $\mu$m/m$^2$·day·atm, which indicates insufficient gas barrier properties. Accordingly, it has been found that these resin compositions are not suited as raw materials for a closure for containers or a sealing element for the closure.

EXAMPLE 15

By injection molding the resin compositions of Referential Examples 1 to 12, threaded caps each having a diameter of 25 mm and a height of 13 mm were produced, respectively.

When attempts were made to mount the resulting threaded caps onto threaded glass containers, the caps could be locked completely in any of the cases.

Comparative Example 9

In a similar manner to Example 15 except for the use of the resin compositions of Referential Examples 13 and 14, threaded caps were produced, respectively.

When attempts were made to mount each of the resulting threaded caps onto a threaded glass container, no sufficient mounting could be procured because of the poor slide between the cap and the container.

EXAMPLE 16

Each of the resin compositions of Referential Examples 1 to 12 was formed into a sheet of 0.5 mm thick by extrusion. The resulting sheet was punched into a disk shape, whereby a disk-like sealing element was produced. The sealing element so obtained was thermally fused onto the inside of the body of an aluminum threaded cap for adhesion.

An attempt was made to mount the resulting threaded cap onto a threaded glass container, complete locking could be procured.

Comparative Example 10

In a similar manner to Example 16 except for the use, as a resin composition, of the resin compositions of Referential Examples 13 and 14, a sealing element was produced and it was thermally fused onto the cap body.

An attempt was made to mount the resulting threaded cap onto a threaded glass container, but no sufficient locking could be procured because of the occurrence of the back motion of the cap during locking.

EXAMPLE 17

Each of the resin compositions of Referential Examples 1 to 12 was subjected to melt extrusion onto the inside of the body of an aluminum threaded cap, followed by compression molding, whereby a cap was produced.

When the resulting cap was mounted onto a threaded glass container, complete locking could be achieved.

Comparative Example 11

In a similar manner to Example 17 except for the use, as a resin composition, of each of the resin compositions of Referential Examples 13 and 14, a cap was produced.

When an attempt was made to mount the resulting cap onto a threaded glass container, no sufficient locking could be achieved because of the occurrence of the back motion of the cap during locking.

The resin composition according to the present invention containing a polyolefin resin (A), a vinyl alcohol copolymer (B) and a specific block copolymer (C') in a defined ratio has suitable flexibility as a molding or forming material and besides, has high gas barrier properties, good heat resistance and good moldability or formability. The molded or formed articles obtained from the resin composition therefore exhibit the above properties effectively and can be used effectively as various sealing materials, packaging films, containers and the like which are used under high temperature conditions.

A closure for containers and a sealing element for the closure, each formed of a molding material containing a polyolefin resin (A), a vinyl alcohol copolymer (B) and an elastomer (C) in a defined ratio and having suitable flexibility and besides, having high gas barrier properties and good oil resistance, exhibit such excellent properties effectively, have good mountability onto (or within) a container and good hermetically sealing properties, and is excellent in long-term shelf stability of the contents.

What is claimed is:

1. A closure,
   (1) which is a closure for a container,
   (2) wherein at least a sealing element of the closure is formed of a resin composition comprising as principal components (A) a polyolefin resin, (B) a vinyl alcohol copolymer and (C) an elastomer which is a block copolymer containing an aromatic vinyl polymer block (block (a)) and an isobutylene polymer block (block (b)); said component (B) being contained in an amount of 10 to 1000 parts by weight per 100 parts by weight of the component (A) and the component (C) being contained in an amount of 5 to 100 parts by weight per 100 parts by weight, in total, of the components (A) and (B); said resin composition being prepared by mixing said components (A), (B) and (C) under melting conditions; said resin composition satisfying the following conditions: [a]>[b] and [c]>[b], where the melt viscosities of the components (A), (B) and (C) are represented by [a], [b] and [c], respectively as measured at the same temperature under said melting conditions and at a shear rate of 100 sec$^{-1}$.

2. A sealing element,
   (1) which is a sealing element for a closure for a container; and
   (2) is formed of a resin composition, which comprises as principal components (A) a polyolefin resin, (B) a vinyl alcohol copolymer and (C) an elastomer which is a block copolymer containing an aromatic vinyl polymer block (block (a)) and an isobutylene polymer block (block (b)) ; said component (B) being contained in an amount of 10 to 1000 parts by weight per 100 parts by weight of the component (A) and said component (C) being contained in an amount of 5 to 100 parts by weight per 100 parts by weight, in total, of the components (A) and (B), said resin composition is prepared by mixing said components (A), (B) and (C) under melting conditions, and satisfies the following conditions: [a]>[b] and [c]>[b], where the melt viscosities of the components (A), (B) and (C) are represented by [a], [b] and [c], respectively as measured at the same temperature under said melting conditions and at a shear rate of 100 sec$^{-1}$.

3. The closure according to claim 1, wherein block (a) has a number-average molecular weight of from 3000 to 80000.

4. The closure according to claim 1, wherein block (b) has a number-average molecular weight of from 10,000 to 200,000.

5. The closure according to claim 1, wherein block (a) is present in an amount of 10 to 60% by weight based on the total amount of block (a) and block (b).

6. The closure according to claim 1, wherein said block copolymer is a triblock copolymer having a structure of block (a)-block (b)-block (a).

7. The sealing element according to claim 2, wherein block (a) has a number-average molecular weight of from 3000 to 80000.

8. The sealing element according to claim 2, wherein block (b) has a number-average molecular weight of from 10,000 to 200,000.

9. The sealing element according to claim 2, wherein block (a) is present in an amount of 10 to 60% by weight based on the total amount of block (a) and block (b).

10. The sealing element according to claim 2, wherein said block copolymer is a triblock copolymer having a structure of block (a)-block (b)-block (a).

* * * * *